US006735720B1

(12) United States Patent
Dunn et al.

(10) Patent No.: US 6,735,720 B1
(45) Date of Patent: May 11, 2004

(54) METHOD AND SYSTEM FOR RECOVERING A FAILED DEVICE ON A MASTER-SLAVE BUS

(75) Inventors: John C. Dunn, Issaquah, WA (US); Kenneth D. Ray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 09/584,554

(22) Filed: May 31, 2000

(51) Int. Cl.$^7$ ................................................ G06F 11/00

(52) U.S. Cl. ...................................................... 714/43

(58) Field of Search ..................... 714/43, 44; 710/302, 710/304

(56) References Cited

U.S. PATENT DOCUMENTS

| | | | | |
|---|---|---|---|---|
| 4,423,480 A | * | 12/1983 | Bauer et al. ................. | 710/100 |
| 5,687,167 A | | 11/1997 | Bertin et al. | |
| 5,701,305 A | * | 12/1997 | Albrecht ...................... | 714/712 |
| 5,848,266 A | | 12/1998 | Scheurich | |
| 6,000,040 A | * | 12/1999 | Culley et al. .................. | 714/31 |
| 6,049,828 A | * | 4/2000 | Dev et al. .................... | 709/224 |
| 6,252,886 B1 | | 6/2001 | Schwager et al. | |
| 6,262,974 B1 | | 7/2001 | Chevalier et al. | |
| 6,279,060 B1 | * | 8/2001 | Luke et al. .................... | 710/64 |

OTHER PUBLICATIONS

Universal Serial Bus Specification; Revision 1.1; Sep. 23, 1998 (http://www.usb.org/developers/docs).*
IEEE Std 1394–1995, "*IEEE Standard for a High Performance Serial Bus,*" pp. i–viii, 1–384, (1996).
Garney, "An Analysis of Throughput Characteristics of Universal Serial Bus," USB technical paper, Dec. 6, 1996.
*Microsoft Corporation*, "Microsoft's USB plans," published at www.microsoft.com/HWDev/presents winhec98/winhec3–4.htm, accessed Apr. 16, 1999.
*Microsoft Corporation*, "Layered I/O, IRPs, and I/O Objects," published at www.microsoft.com/DDK/DDK docs/win 50ddk/02irps 46qv.htm, accessed Apr. 16, 1999.

(List continued on next page.)

*Primary Examiner*—Scott Baderman
*Assistant Examiner*—Joshua Lohn
(74) *Attorney, Agent, or Firm*—Leydig, Voit & Mayer, Ltd.

(57) ABSTRACT

The invention described in the instant application provides for a failure-recovery module, which permits automatic investigation of possible reasons for the failure and takes corrective action in a manner transparent to the user. The failure-recovery module, which is a software module, is useful in evaluating a device connected to a master-slave bus to determine whether it has failed. In the event the device is still connected to the master-slave bus but is non-responsive, the failure-recovery module resets the device, e.g., by turning off the power to the affected device and rebooting the device with a cold start. The failure-recovery module diagnoses the failure of a device by determining if the device is still connected to the master-slave bus. Then, the failure-recovery module sets a flag to mark the device as having failed while disabling access to devices downstream of the failed device. If the failure-recovery module is unable to execute successfully, it assumes that the failure causing condition still exists. In some embodiments this results in rescheduling the execution of the failure-recovery module while in other embodiments a general failure may be declared or the failed device left in its disconnected state. On the other hand, if the failure-recovery module executes successfully, the affected device is reinitialized and the flags marking it as failed are cleared with access to the device being restored. Subsequently, downstream devices are reinitialized and resources, if available, allocated to them along with enumeration of the devices.

33 Claims, 6 Drawing Sheets

OTHER PUBLICATIONS

*Microsoft corporation*, "WDM USB Driver Interface," published at www.microsoft.com/HWDev/desinit/wdmusb.htm, accessed Apr. 29, 1999.

*Microsoft Corporation*, "USB System Software," published at htt;://msdn. microsoft.com/library/tools/wceddk/usb 6.htm, accessed Apr. 29, 1999.

*MIcrosoft Corporttion*, "WMI System Properties," published at http://msdn.microsoft.com . . . rary/sdkdoc/wbem/hmmprop–1hrn.htm, accessed Apr. 29, 1999.

*Microsoft Corporation*, "Plug and Play for Windows 2000," published at www.microsoft.com/hwdev/desinit/pnpnt5 2.htm, accessed Apr. 12, 1999.

*Microsoft Corporation*, "Handling Asynchronous Bulk Data Transfer in a USB Minidriver," published at www.microsoft.com/hwdev/driver/usbmini.htm, accessed Apr. 12, 1999.

Anderson, "Firewire System Architecture," $2^{nd}$ ed. *MindShare, Inc.* (1998).

Entrega, Technologies Inc., "Net–USB–USB Instant USB Network Product Information," retrieved from http://www.entrega.com/con usb prodinfo.html, accessed Mar. 17, 2000.

* cited by examiner

METHOD AND SYSTEM FOR RECOVERING A FAILED DEVICE ON A MASTER-SLAVE BUS

TECHNICAL FIELD

This invention relates generally to making computing environments having a plurality of devices interconnected by one or more buses stable and capable of automatically recovering from failures, and more particularly, relates to devices connected to a computer environment via a Universal Serial Bus (USB).

BACKGROUND

Many new applications in the area of computers, networks and computing environments in general require interconnection of several devices to meet particular needs such as a personal office, a gaming machine with a variety of peripherals or a home network that controls the television, VCR or even the coffee maker. Devices can be interconnected using a variety of buses such as a memory addressed bus, e.g., one compliant with the IEEE 1394 specifications, found at http://standards.ieee.org/catalog/bus.html#1394–1995, or a polled bus, e.g., the Universal Serial Bus ("USB"), described by the specifications at http://www.usb.org, or many other specifications. A bus in general is a structure to which several other devices can be connected. Thus, a device may be considered to be a bus if other devices may be plugged into it.

A goal of designing computing systems is to enable hands-off operation of devices requiring little effort beyond merely plugging a device into a suitable socket. This requires implementation of a bus that is maintenance free. In turn, such designs require that the devices being plugged into the bus be compliant with the bus specifications to allow automatic configuration of the computing environment in response to the addition or removal of a device.

In particular, when a central master control is used, it is advantageous to use a USB to connect peripherals to the central control although other bus designs, including the IEEE 1394 compliant bus, can also be used to implement master-slave device controls. USB is a cable bus that supports data exchange between a host and a plurality of peripheral devices by means of serial data packets. The USB design permits a tree-like topology for connecting up to 127 devices with the host at the root of the tree. Advantageously, the host is implemented in a personal computer, although this is not a requirement.

Devices connected to a USB fall into two major classes—functions and hubs, which are differentiated by the roles they play in the organization and operation of the USB system. Each USB hub has a hub controller, which initiates all data transfers. In addition, each hub has one upstream port and at least one downstream port for connecting additional devices, including hubs. Therefore, a hub is a bus in its own right. In contrast, functions are devices that do not possess ports for connecting additional devices downstream from them, but usually perform tasks. Some examples of tasks performed by functions include collecting data via a video camera, providing audio output via speakers, telephony, faxing and/or modem based access. A USB hub that also performs tasks is considered by the USB to comprise a hub connected to one or more functions.

An IEEE 1394—compliant serial bus provides greater bandwidth (100 Mbps or more) than the USB (12 Mbps), although version 2.0 of the USB specification being developed envisages a forty-fold increase in bandwidth while maintaining backward compatibility. Notably, both USB and IEEE 1394 buses power devices connected to them, although this is not a requirement for a bus in general. USB is preferable to IEEE 1394 bus for many applications due to its simple, robust design that does not require expensive devices to function as nodes. Since many of the management functions of a USB can be performed at a computer implementing the host and associated drivers, it offers a cheaper alternative that uses available computing power efficiently.

However, the USB, as presently implemented, has a number of limitations that reduce its utility. In actual use, bus implementations are susceptible to failures that may not be easy to pinpoint and may even be transient. Of particular interest are failures due to poor power line regulation, which is encountered in some countries in Europe and Asia—both being important markets, or due to electrostatic discharge or difficult-to-diagnose state of the electronics in the devices. Failure of a device in a USB could also be caused by software or a particular state of the device in addition to poor power line regulation or a resource crunch. Such limitations can be particularly vexing for users who are not computer-literate. Consequently, it is desirable to make recovery from errors increasingly transparent to the user because the average user cannot be expected to skillfully diagnose and correct such conditions as a matter of routine.

SUMMARY

The invention described in the instant application overcomes these limitations and more by providing for a failure-recovery module, which permits automatic investigation of possible reasons for the failure and takes corrective action, when desired, to make such troubleshooting transparent to the user. The failure-recovery module is advantageously implemented as a software module. It is useful in evaluating a device connected to a master-slave bus to determine whether it has failed. In the event the device is still connected to the master-slave bus but is non-responsive, the failure-recovery module resets and reinitializes the device. This resetting may require turning off the power to the affected device and rebooting the device with a cold start. Alternatively, a mere reboot without terminating all power to the device may be employed.

The failure-recovery module diagnoses the failure of a device by determining if the non-responsiveness is due to the device being physically disconnected. If the device is still connected to the master-slave bus, then since the device failure was not handled by the built in mechanisms in the bus to handle failures, the failure is determined to be due to unknown causes. The failure-recovery module then, in response to the determination of failure due to unknown causes, sets a flag to mark the device as having failed while disabling access to devices downstream of the failed device. Subsequently the resources allocated to the downstream devices to the failed device are released. This is accompanied or followed by a re-initialization of the failed device with or without a cold start.

If the failure-recovery module is unable to execute successfully, it assumes that the failure causing condition still exists. In some embodiments this results in rescheduling the execution of the failure-recovery module while in other embodiments a general failure may be declared or the failed device left in its disconnected state. On the other hand, if the failure-recovery module executes successfully, the affected device is reinitialized and the flags marking it as failed are cleared with access to the device being restored.

Furthermore, devices downstream of the device are also reinitialized and resources, if available, allocated to them.

It should be understood, as would be apparent to one of ordinary skill in the art, that many embodiments of the invention are possible, which do not necessarily require use of the USB, and, thus, are not limited to the USB.

Additional features and advantages of the invention will be made apparent from the following detailed description of some of the many possible illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
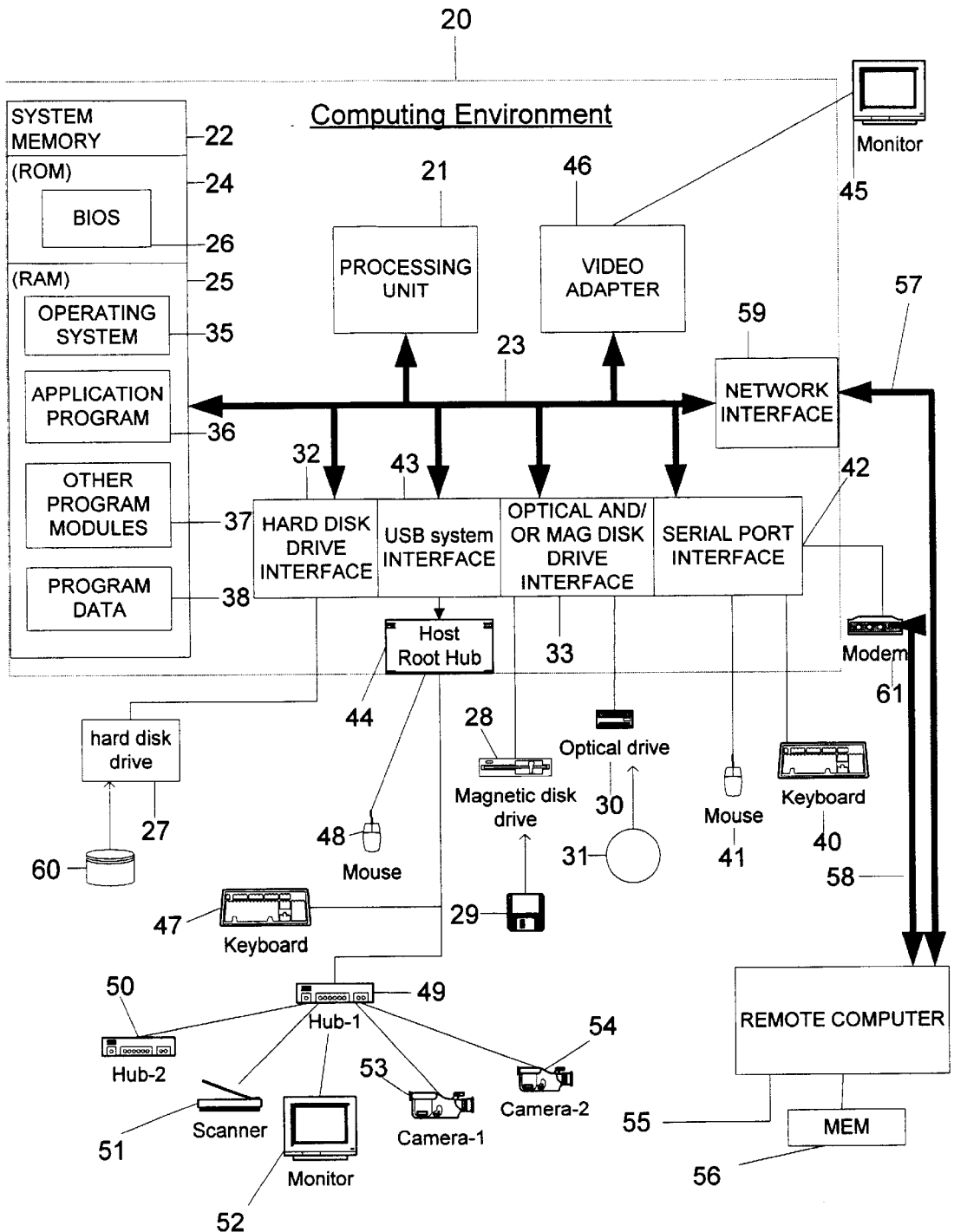
FIG. 1 is a block diagram generally illustrating an exemplary computing environment on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computing environment 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing environment 20, such as during start-up, is stored in ROM 24. The computing environment 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32 and a magnetic and/or optical disk drive interface 33, respectively. The drives and their associated computer-readable media provide nonvolatile storage of computer readable instructions, data structures, program modules and other data for the computing environment 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

Computing environment 20 includes computer-readable media including volatile and nonvolatile, removable and non-removable media implemented in any technology or method for information storage such as computer instructions, data structures, program modules, and the like. Computer-storage media includes, but are not limited to, RAM, ROM, EEPROM, flash memory, and other memory technology, CD-ROM, Digital versatile disks, etc., that can be used to store and access the information. Communication media typically includes computer-readable instructions, data structures, program modules, or data in a modulated data signal such as a carrier wave.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information through input devices such as a keyboard 40 and a pointing device 41. Other input devices (not shown) may include a microphone, joystick, game pad, satellite dish, scanner, or the like. These and other input devices are often connected to the processing unit 21 through a serial port interface 42 that is coupled to the system bus. Increasingly, such devices are being connected by the next generation of interfaces, such as a universal serial bus (USB) 43 with a root hub/Host 44, and to which other hubs and devices may be connected. Other interfaces that may be used include parallel ports, game ports, and the FireWire, i.e., the IEEE 1394 specification available at http://standards.ieee.org/catalog/bus.html#1394–1995. A monitor 45 or other type of display device is also connected to the system bus 23 via an interface, such as a video adapter 46. In addition to the monitor, personal computers typically include other peripheral output devices.

The USB connections illustrate its utility. A keyboard 47, a pointing device 48 and another hub, hub-1 49, are connected to the root hub/Host 44. Hub-1 49 is further connected to another hub, hub-2, 50, scanner 51, monitor 52, camera-1 53, and camera-2 54. Monitor 52 preferably uses USB for configuration and control rather than streaming input, although later USB versions may advantageously be used for streaming input to monitor 52.

The computing environment 20 may operate in a networked environment using logical connections to one or more remote computers, such as a remote computer 55. The remote computer 55 may be another computing environment such as a server, a router, a network PC, a peer device or other common network node, and typically includes many or all of the elements described above relative to the computing environment 20, although only a memory storage device 56 has been illustrated in FIG. 1. The logical connections depicted in FIG. 1 include a local area network (LAN) 57 and a wide area network (WAN) 58. Such networking environments are commonplace in offices, enterprise-wide computer networks, intranets and the Internet. USB provides another way to connect to a network by either using a communication link via a modem, an ISDN connection and the like, or even a hub that can be connected to two computers, e.g., "ENTREGA® USBnet." Such hubs, however, require special software.

When used in a LAN networking environment, the computing environment 20 is connected to the local network 57 through a network interface or adapter 59. When used in a WAN networking environment, the computing environment 20 typically includes a modem 61 or other means for establishing communications over the WAN 58. The modem 61, which may be internal or external, is connected to the system bus 23 via the serial port interface 42. In a networked environment, program modules depicted relative to the computing environment 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. It should be noted that in evaluating robustness and operation of a bus system, the discussion below focuses on USB for illustrative purposes only and is not intended to be a limitation on the scope of the claims. In particular, a master-slave bus may be simulated in a IEEE 1394 bus or other possible bus designs and may consequently benefit from practicing the invention disclosed herein.

USB provides for a star topology for connecting together a Host, which forms the root of the star or the tree, and a plurality of Hubs and functions. Each hub can have as many as seven ports for connecting functions or additional hubs. To accommodate various anticipated applications, data transmission on the USB is primarily of four types, differing in the quality of service guarantees and content, viz., isochronous transfer, interrupt transfer, bulk transfer and control transfer of which control and interrupt transfer are of the greatest interest here. Interrupt transfer supports correction of corrupted data by retransmission of corrupted data. Interrupt transfers also enjoy a system assurance of transmission within a given time latency (which may be analogized to Quality of Service (QoS)) with acknowledgment of uncorrupted data. Data transfer is targeted to a logical endpoint on a device and hence occurs through pipes defined by the endpoints on the device originating the data transfer and the device consuming the data being sent. Notably, messages on the USB include predefined types such as for confirming receipt of a message, requesting/carrying data, or indicating a transient inability to respond and even indicating a change in status or a fault requiring attention prior to any further processing.

In general, each USB device may support several endpoints, typically defined in course of initializing the device, with each endpoint supporting a particular kind of data transfer. In addition to the endpoint 0 (supporting control transfer) required of all USB compatible devices, USB hubs are also required to support a status pipe to communicate changes, e.g., due to connection or disconnection of a device at one of the downstream ports of the hub, to the host.

Figure 2:
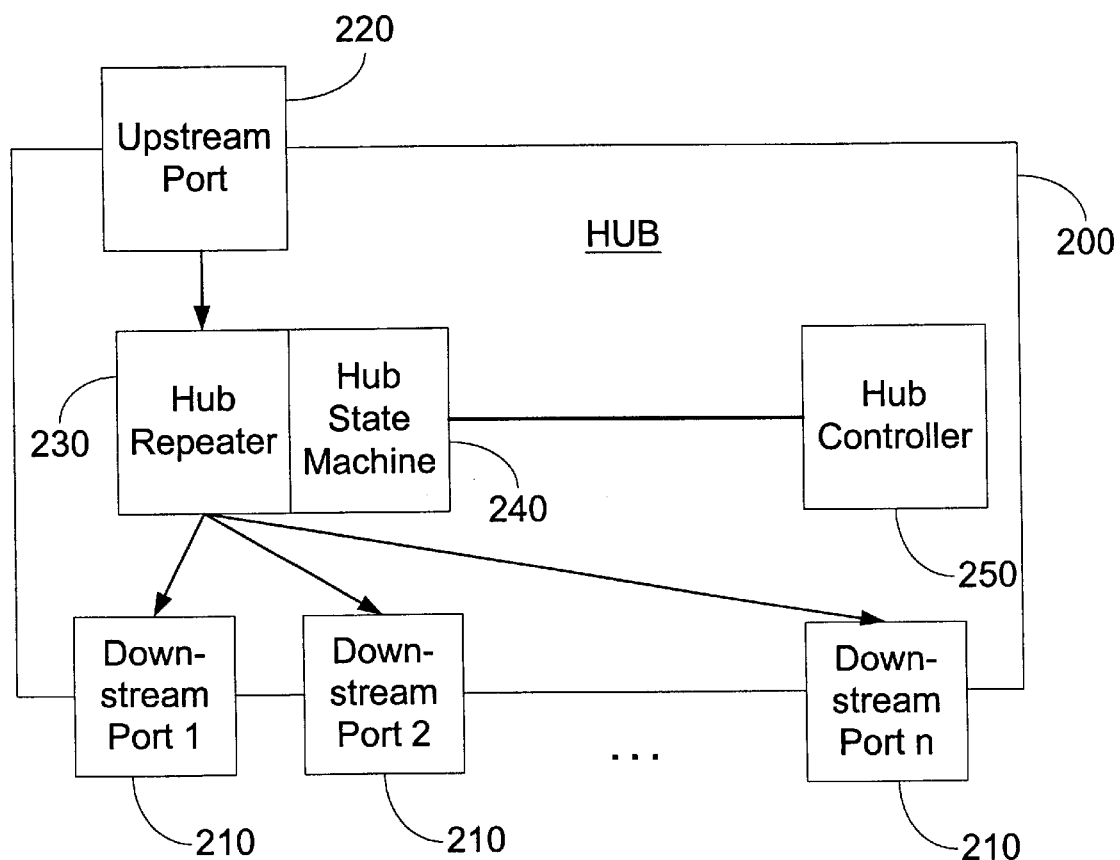
FIG. 2 is a schematic of a typical USB hub.

Hubs play a central role in the operation of the USB, being essential for establishing connectivity between the USB host and other devices. A USB hub is a device that provides downstream ports for connecting other devices including additional USB hubs. Many hubs, including USB hubs, also function as busses to some extent. FIG. 2 illustrates a typical USB hub 200 with its downstream ports 210, at least one upstream port 220, a USB hub repeater 230, a USB hub state machine 240, and a USB hub controller 250. The USB hub repeater 230 broadcasts signals received on the upstream port 220 to the enabled ports from the downstream ports 210. Each hub 200 also detects the connection or disconnection of a device on any one of its downstream ports. In addition, a hub can reset or render inactive any of its downstream ports, and consequently the device or devices connected downstream of that port. In view of the special role played by USB hubs, they are required to support an endpoint in addition to that for control pipe 0, i.e., the Status Change Endpoint. This endpoint supports interrupt transfers, which in general on a master-slave bus are messages delivered with an assured Quality of Service (QoS), to inform the USB host of status changes on the particular USB hub in response to polling by the host. Examples of such changes include the connection and removal of devices to one or more of the ports of the hub.

Each USB host includes a root hub to which other devices, including other hubs, are connected. This root hub may not be a hub device but may be a root port on the USB host controller in some USB implementations. In such implementations, the USB host controller emulates a USB hub interface in its interactions with the USB system software, thus appearing to be just another USB hub device with some differences that are not relevant in this context.

When a device is connected to a downstream USB port on a hub, the hub detects the presence of the device. The hub informs the host using its status change pipe that an event has taken place. When the host polls the various hubs, possibly as part of the enumeration process, to determine the status of the various ports and devices in the USB, the relevant information is transferred to the host via interrupt transfers, e.g. with prescribed QoS. Armed with the knowledge of which port the device is connected to, the host issues a port enable signal and a reset signal to that port to reset the device into an initial state. The host then communicates with the device using control transfer on end point 0, which every USB compatible device is required to support. As a result of these communications, the host learns of the configuration modes supported by the device and the nature and number of endpoints it can support. A unique address is assigned to the device by the host and the state of the device is set to Address state. In effect, the host provides a centralized master control for managing the USB.

Typically, each USB component has a corresponding driver, in part, to translate queries into commands that the USB hardware can understand. Furthermore, the drivers for devices connected to the USB provide well documented interfaces, specified in the USB specifications, to allow devices and software from different manufacturers to function together. In order to execute a request directed to a USB connected device several drivers participate in order to ensure that the Host, the hub and the device function are able to play their roles satisfactorily. From a conceptual point of view the drivers include a USB.SYS driver, a USB host driver, possible drivers for one or more USB hubs in the path to the port to which the device is connected and, of course, one or more drivers corresponding to the function device itself. However, not all transactions need to be addressed to a function device. It is noteworthy that these devices are not required to be from the same manufacturer, and hence have to support a common set of interfaces to ensure interoperability.

Some USB embodiments advantageously use interfaces and procedures provided by an operating system to configure and control USB. Operating systems providing support for USB include "WINDOWS" brand operating systems, manufactured by "MICROSOFT®" corporation of Redmond, Wash., such as various releases of "Windows 95", "Windows 98", and "Windows 2000."

Some embodiments of the invention described herein are based on the "WINDOWS" brand operating systems. However, it should be understood that the scope is not restricted to any particular operating system although different operating systems differ in the ease with which various embodiments can be implemented. As one of ordinary skill in the art will recognize, this does not mean undue experimentation but merely the absence of well known supporting features in some operating systems.

Different operating systems provide support for USB in different ways. In the "WINDOWS®" operating systems manufactured by the "MICROSOFT®" corporation of Redmond, Wash., a layered driver model is employed. Typically, the operating system includes a generic driver or a class driver and a mini-driver, provided by the device vendor, allowings access to additional device capabilities. Drivers are loaded dynamically either at system startup or in response to an event such as connection or removal of a device to or from a plug-and-play-compliant bus. The I/O system provides a device-independent interface between device drivers and the remainder of the operating system by defining a series of standard interfaces. A request to a device results in the building of an I/O Request Packet ("IRP") by the I/O Manager. An IRP is a data structure that is sequentially handled by the relevant drivers, each one of which performs its task while passing the IRP to the next driver. More specifically, an IRP includes, in its data-structure, fields for specifying functions, referred to as minor and major function codes, that need to be performed by one or more devices to facilitate I/O control functions (IOCTLs). In addition, an IRP may also provide pointers to input and output buffers as part of the I/O stack locations in their data-structure. Once all the drivers have handled the IRP, it is returned to the requesting client.

The configuration of the new device is carried out in conjunction with the plug-and-play manager resident on the computer implementing the host. This plug-and-play manager maintains a database of devices connected to the system and triggers loading or unloading of the respective drivers in response to events. If USB can support the requested resources, the device is configured with its parameters set and is ready from the point of view of the device. Typically, a plug and play manager keeps track of devices present in the system and triggers the loading or unloading of drivers in step with the availability or removal of the corresponding devices.

One of the invention embodiments in the context of the USB advantageously allows detection of the failure of a hub and suspends processing of IRPs requiring access to the failed hub and devices downstream of the failed hub. The hub-driver upstream of the failed hub then makes a function call on an application, named failure-recovery in this application, although other names such as ElectroStatic Discharge Recovery ("ESD Recovery") or Hub Recovery Mechanism code ("HRM code") could be used as well, to analyze and correct, if possible, the failure of the hub to respond.

In the context of USB, in addition to a USB Interrupt transfer failing due to an actual physical USB Hub device failure, it can fail from physical disconnection of a USB Hub device from the USB. When the USBHUB.SYS software module detects that the USB Interrupt transfer for a given externally connected USB Hub has failed, it first tries to determine if this was caused by USB Hub device physical removal. It does so by querying the status of the port that the USB Hub was connected to on its parent USB Hub. If the "CONNECT" status bit is not set for the port status of the port that the failed USB Hub was connected to on its parent hub, it is then assumed that the device had been physically removed, and thus the Hub Recovery Mechanism code is not activated. Note that it is possible that this parent USB Hub is not a hub device at all but rather a root port on the USB Host Controller. In this case, the USB Host Controller emulates a USB Hub device, but this device is exposed to the USBHUB.SYS software module as any other real externally-connected USB Hub device with some exceptions.

If the reason for the USB hub device failure is determined to not have been caused by physical removal of the device from the USB (i.e. the "CONNECT" status bit is set for port on the parent USB hub that the failed USB hub is connected to), then it is assumed that the hub Device is still present on the USB and thus has failed for some unknown reason. The USB Hub Recovery Mechanism code is then activated.

The first action that is taken by the USB Hub Recovery Mechanism code is to set a flag in the software device extension for the failed USB Hub device. This flag indicates to other software functions within the USBHUB.SYS module that the USB Hub has failed and is in the process of attempted recovery, and those other software functions can deal with the situation accordingly (e.g., don't enumerate devices on the USB Hub and allow no transfers to the USB hub or child devices). Next, a software removable of all of the downstream child USB devices of the failed USB hub is performed. This essentially notifies the host operating system (specifically the "Plug and Play" subsystem) that the child USB devices are essentially no longer present, and software cleanup is performed to release all structures allocated on device initialization from memory.

Once the failed USB hub device has been flagged in the software and software removal of the child devices has been initiated, then the actual Hub Recovery Mechanism code/ failure-recovery code is scheduled to run. This code is scheduled to run after a delay of five seconds although other time intervals may be chosen with no loss in generality. If the Hub Recovery Mechanism itself fails it is assumed that the condition that caused the original failure is still present, and the Hub Recovery Mechanism will be rescheduled. The software may not reschedule the Hub Recovery Mechanism, e.g., based on number of tries and the like and if this occurs then the Hub Recovery Mechanism has essentially failed with the USB Hub device being unrecoverable, and the USB Hub left in a failed state.

When the scheduled Hub Recovery Mechanism code is run after the delay of five seconds, flags and conditions are checked to determine that the USB Hub device is still present and not removed or powered down. Once these sanity checks have been met, the port on the parent USB Hub that the failed USB Hub is connected to is reset. If this parent port reset fails, it is assumed that the USB Hub is still experiencing the conditions that caused the original failure and the Hub Recovery Mechanism is then rescheduled to run again after the given five second delay.

Once the parent port reset is successful the USB Hub is then powered down in order to reset the USB Hub device itself. Note that some USB Hubs will be already powered down due to the port it is connected to being reset, but the USB Hub is powered down nonetheless. Then, after the USB Hub has been powered down, it is powered back up again. This should leave the USB Hub in a fresh state, as if it had just been powered on for the first time on initial operating system bootup. After the USB Hub power up is complete, the flags indicating that the USB Hub is in recovery mode are reset, and then the downstream USB devices connected to the USB Hub are then reenumerated, again exactly as if the USB Hub had been powered on for the first time. If all goes well, the USB Hub and all downstream USB devices should be working and fully operational once again as if a failure had never occurred. As mentioned previously, if any downstream USB device fails this reenumeration procedure then that device is not re-initialized and is presented to the operating system as a device in a failed state.

Figure 3:
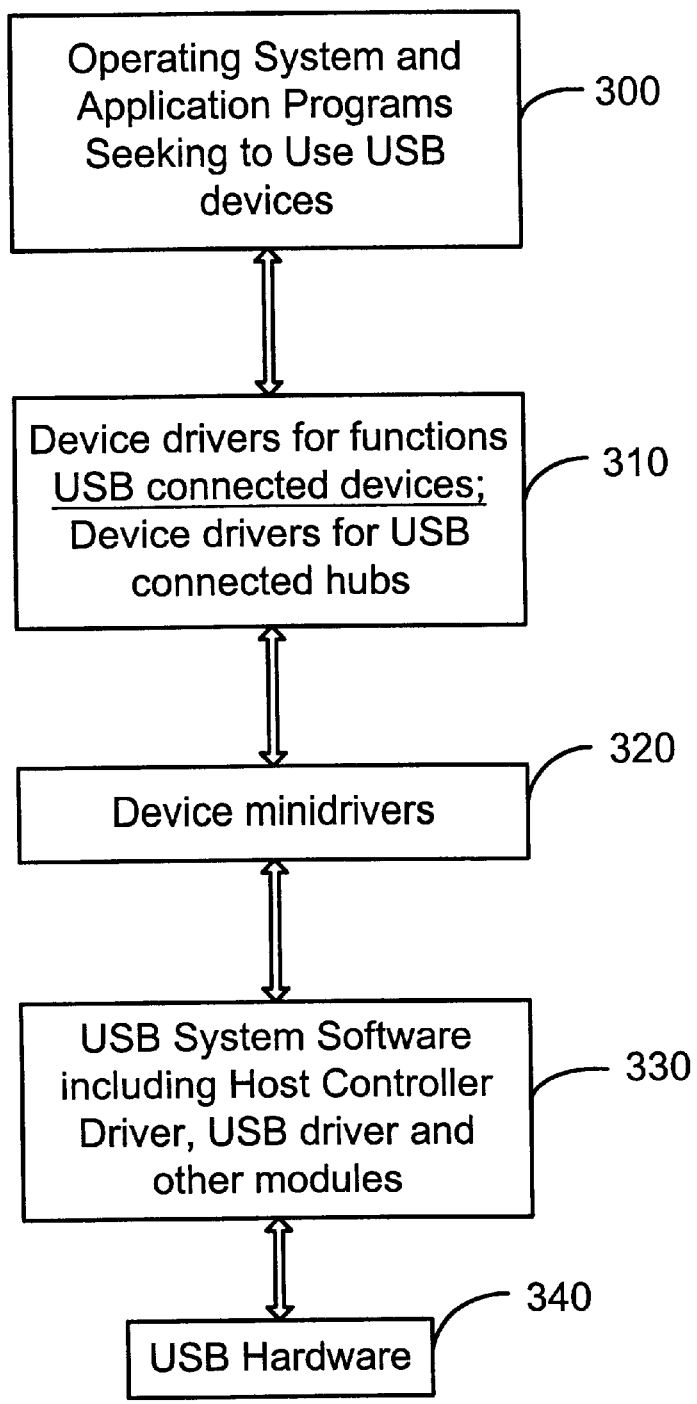
FIG. 3 illustrates a possible USB implementation with a plurality of devices connected to a computer system via the USB Host.

FIG. 3 illustrates a logical high-level diagram of exemplary USB system software and device drivers interacting with a computer system. Block 300 illustrates applications requiring input from devices connected via USB or sending output to USB devices or seeking to control or modify USB devices via requests to the operating system components. Blocks 310 and 320 represent the device drivers that actually handle requests directed to USB devices. Block 310 represents the class drivers while block 320 represents mini-drivers, if any, that are specific for a particular hardware representation. A requests received by the drivers is usually in the form of an IRP, with a function code specifying the nature of action sought. IRPs are usually constructed by operating system components such as I/O control or extensions to the driver management software such as the "WINDOWS"-brand operating system Management Instrumentation ("WMI") as a result of function calls or by drivers and other kernel-mode modules.

Block 330 shows the next stage of IRP processing. The device drivers pass the IRP after performing their share of the tasks to the USB system software, which includes the Host controller driver, the USB driver and an undefined interface between them. This interface is undefined because it is supplied by the specific operating system—and never available directly to the users. Finally, in block 340, the request is actually executed at the hardware level.

Figure 4:
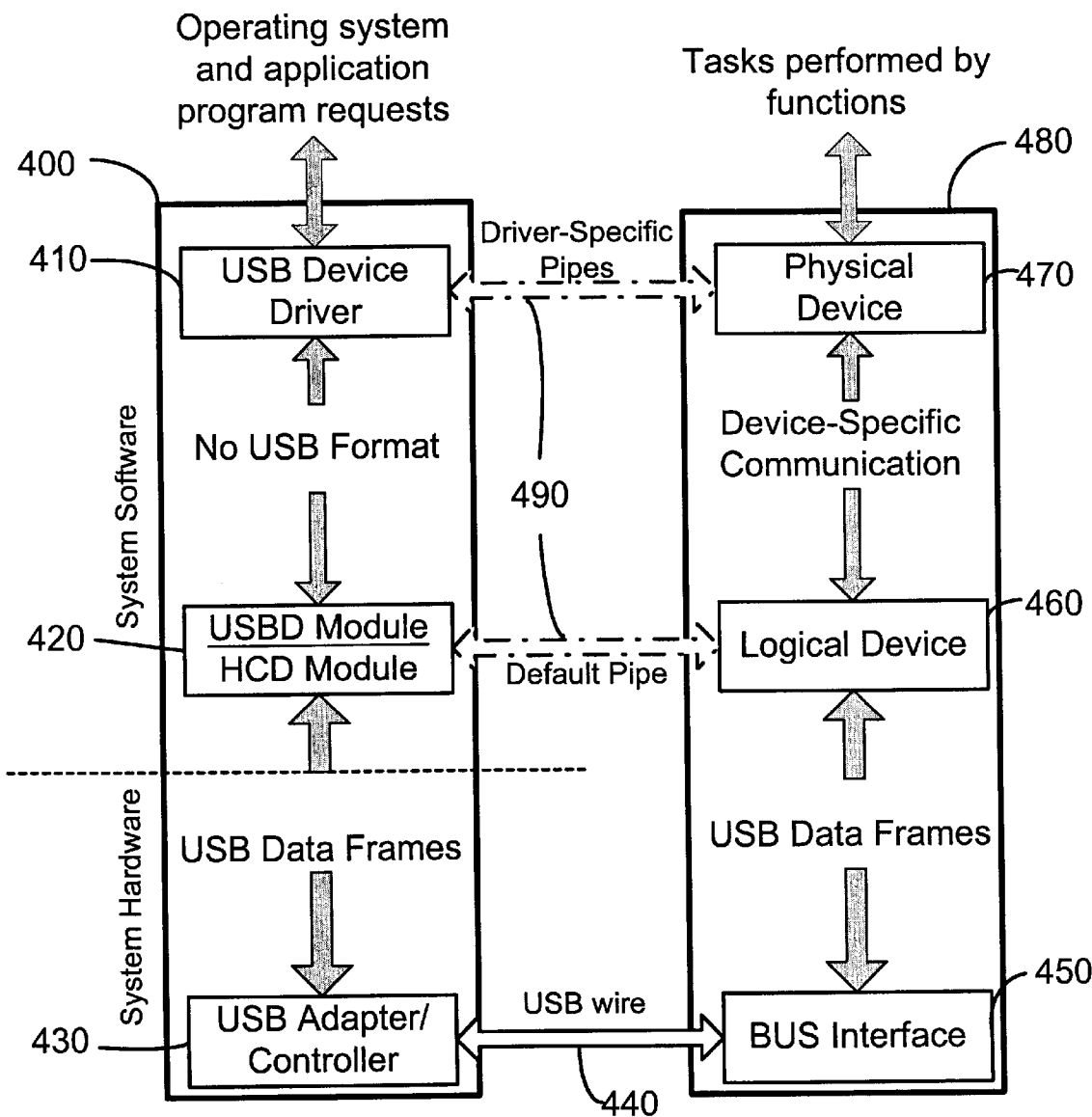
FIG. 4 illustrates a high level representation of the arrangement of drivers for accessing and operating devices connected to a USB.

Another view of data flow and related decision making is illustrated in FIG. 4. Block 400 includes the USB device drivers 410, USB Driver (USBD) and the host Controller Driver (HCD) 420, and the USB Adapter/controller 430. USB wire 440 carries the actual signals from the computer (i.e. as provided by the USB Adapter/Controller) to the devices connected to the USB. The signals are received by the USB Bus 480 at a Bus interface 450 and forwarded to the logical device 460, which in turn, sends them on to the actual hardware for performing the requested task, the physical device 470. As would be apparent to one skilled in the art, this is not the only possible topology and other possible implementations are intended to be within the scope of the invention. It is important to note that to an application accessing the services of a device connected to the USB, the logical connection is to one of the device specific pipes 490.

Although, USB has a simple design, it is subject to errors due to a variety of conditions. Some examples of these include over-current condition caused by a device drawing more current than permissible, e.g., due to a possible short-circuit resulting in the setting of an over-current flag. In addition, a device may respond with a STALL signal to a request for data transfer to indicate that the device is unable to respond or process data. The USB system software handles such error conditions.

However, it is possible for a device to fail in a manner that results in no STALL signal being generated or the over-current flag being set. In such a situation the affected device may hang in an unknown and possibly non-responsive state. Possible causes for such a state include brown outs due to poorly regulated power lines. In particular, it is possible, in part due to the independent power supplies for one or more of the UAB connected devices and the host, that the computer implementing the host may functions satisfactorily while other USB devices may hang in an unresponsive state. Such behavior is difficult to diagnose and correct on the part of an average user and defeats the purpose of the plug-and-play design strategy. Thus, it is of interest to identify such unresponsive failures of devices connected to a master-slave bus, and, in particular, devices connected to a USB.

Identification of such a failure is advantageously followed by a restoration of the affected device or devices to an operational state. In the case of a USB, functions are connected to a downstream port on a hub, which, itself, may be connected to the downstream port of another upstream port.

Figure 5:
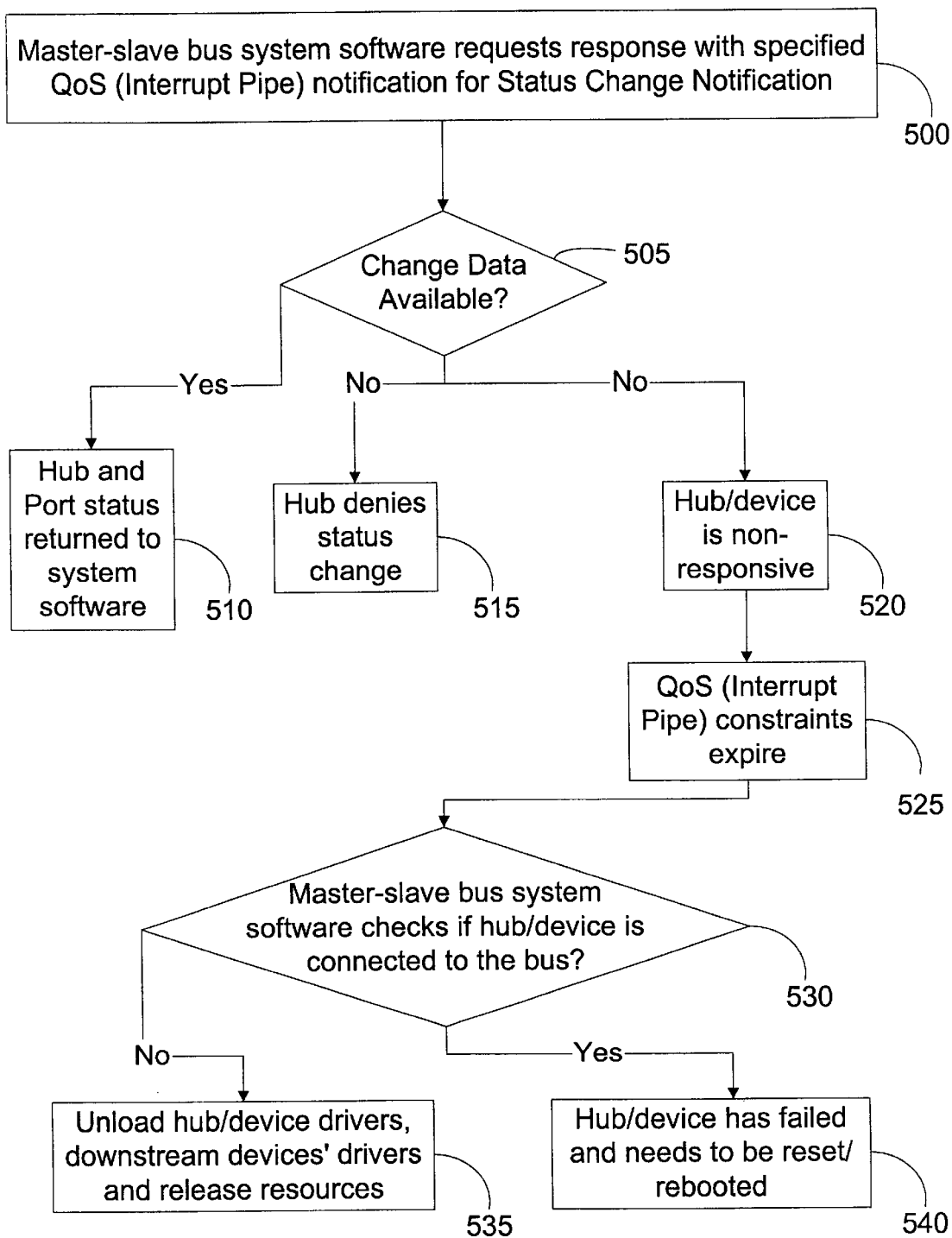
FIG. 5 is a flow chart illustrating some of the steps in determining that a device in a master-slave bus has failed.

FIG. 5 illustrates a possible, but not the only, embodiment in accordance with the invention using a master-slave bus, e.g., USB. A master-slave bus system software, i.e., one or more software modules participating in the centralized management of the master-slave bus, requests responses from a hub or a device connected on one of the downstream ports on the master-slave bus (step 500). This request is advantageously made by means having a defined QoS, e.g., using an interrupt pipe in the case of the USB. If there have been changes (step 505) then either a hub or device responds with the port status and other data (step 510) or, in the absence of changes, the hub or device denies a status change by sending a message (step 515). In the event the hub or device is non-responsive, no response is generated to the polling (step 520) resulting in violation of the expected QoS guarantees (step 525). Since the failure to respond could be due to the hub or device being removed from the master-slave bus, the connectivity of the hub or device is checked (step 530). If the device has been removed, then all devices downstream to it also have to be removed, and the drivers corresponding to the hub or device are unloaded with the resources being released (step 535). If, on the other hand, the hub or device is still connected to the master-slave bus, which may be checked in a USB by examining a status bit corresponding to the relevant port, the hub or device is identified as having failed.

Figure 6:
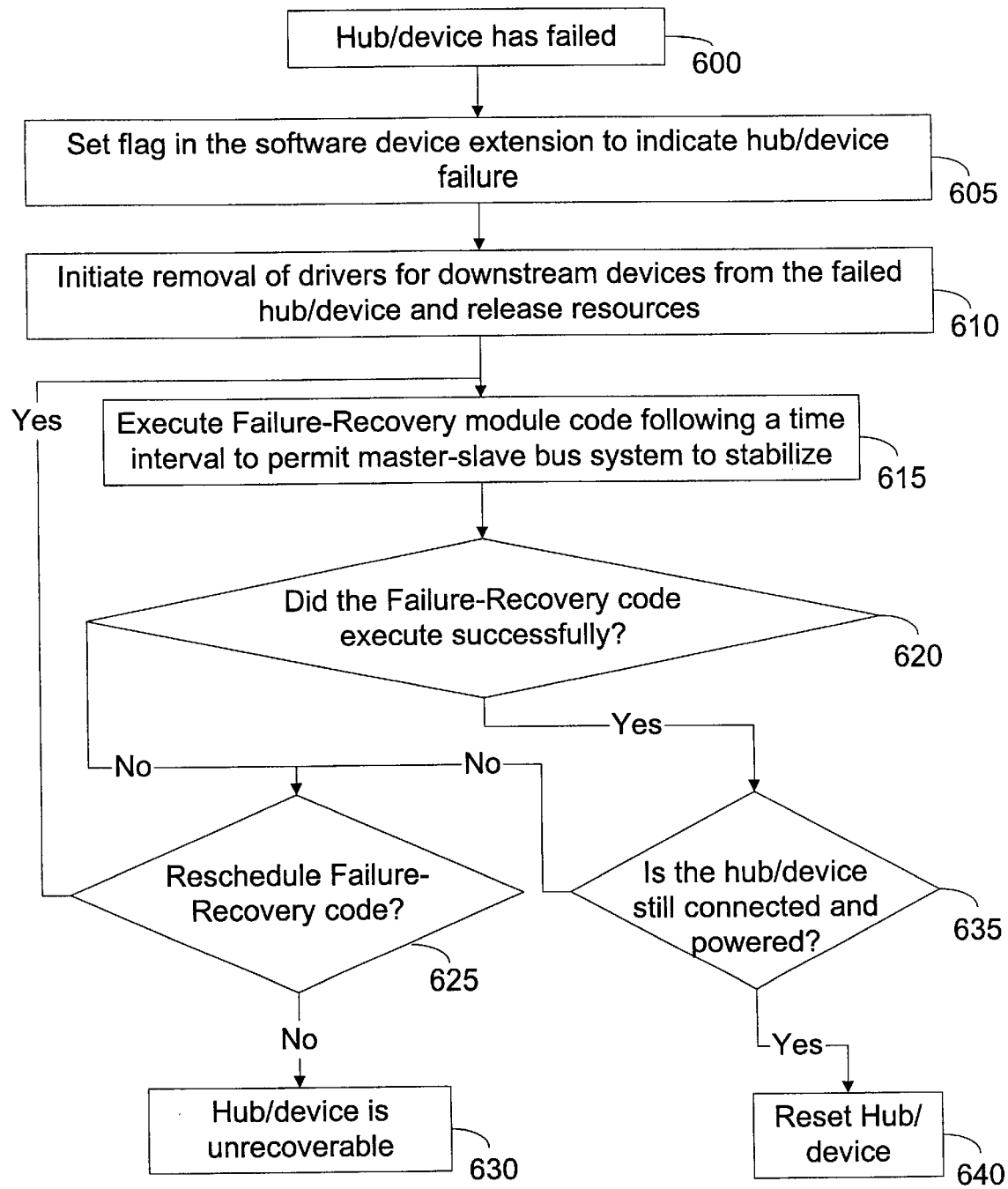
FIG. 6 is a flow chart further illustrating the restoration, if possible, of a failed device in a master-slave bus.

FIG. 6 illustrates further steps in recovering from the failure of a hub/device in a master-slave bus. In the event a hub/device has failed (step 600), a flag is set in the software extension corresponding to the hub/device to indicate that the hub/device has failed (step 605). It is to be noted that although both hubs and devices may be targeted, in some embodiments of the invention only recovery from failure of hubs, i.e., devices that can support additional devices on downstream ports, is attempted. USB hub devices are distinct from function devices and hybrid hubs are considered in USB to be a combination of a hub and one or more additional devices. While this distinction may not be quite as clear or even meaningful in other master-slave busses, it does not detract from the advantages of practicing the invention in the context of other master-slave busses.

This flag is checked by device drivers attempting to access devices downstream of the failed hub/device, e.g., in processing an IRP, and the set flag indicates that the hub/device is unavailable, possibly due to the need to be recovered from its failure state. Consequently, other devices downstream of the failed hub/device are also not accessible. At step 610 resources allocated to devices downstream of the failed device are recovered along with unloading of their drivers. This step ensures that only drivers corresponding to accessible devices are retained. This step does not need to be performed in a time sensitive fashion and in some embodiments of the invention it may be deferred until a later time.

The failure-recovery module code is executed following an optional time interval to allow the master-slave bus to stabilize (step 615) following the events, such as brownouts, resulting in device failure. The failure-recovery module may not be able to execute successfully in all cases (step 620). A decision is made to reschedule the failure-recovery module for execution (step 625), typically based on the assumption that the conditions resulting in device failure have not settled down yet. The failure-recovery module may not be rescheduled after a certain. number of tries, or after a more serious fault condition is encountered and the failed hub/device is treated as unrecoverable (step 630) with its driver unloaded and resources recovered. If the failure-recovery module executes successfully the state of the failed hub/device is checked again to make sure that it is still connected to the master-slave bus and powered (step 635). In the event the hub/device is still present, it is reset (step 640) by driving the port upstream of the device to suspend power to the device followed advantageously by a cold reboot.

Consequently, failure-recovery requests a resetting of the failed hub. In an embodiment, a kernel-mode hub-driver for the hub upstream of the failed hub issues the command to reset the downstream hub. It should be noted that although the discussion has focused on the USB based embodiments, it is feasible to practice the invention in the context of other bus specifications allowing a master-slave management model.

In view of the many possible embodiments to which the principles of this invention may be applied, it should be recognized that the embodiments described herein with respect to the drawing figures are meant to be illustrative only and should not be taken as limiting the scope of the invention. For example, those of skill in the art will recognize that the elements of the illustrated embodiment shown in software may be implemented in hardware and vice versa or that the illustrated embodiment can be modified in arrangement and detail without departing from the spirit of this disclosure. Therefore, this invention contemplates all such embodiments as may come within the scope of the following claims and equivalents thereof.

We claim:

1. A failure-recovery software module for correcting failure of a device connected to a master-slave bus organized in a tree structure comprising a plurality of devices, the tree structure including branches formed by a first device upstream port connected to a second device downstream port, the tree structure having furthermore a root corresponding to a master control for managing the master-slave bus, and the failure-recovery software module comprising computer-executable instructions for:

detecting a non-responsive device connected to the master-slave bus, wherein the non-responsive device does not respond to a status query by a master-slave bus system software in conformity with a specified time interval;

determining that the non-responsive device is powered and connected to the master-slave bus;

requesting resetting a downstream port on a device upstream of the non-responsive device to place the non-responsive device in a first defined state;

configuring the non-responsive device to be in a second defined state from the first defined state; and unloading device drivers corresponding to devices downstream of the non-responsive device.

2. The failure-recovery software module of claim 1 wherein the master-slave bus is a universal serial bus.

3. The failure-recovery software module of claim 1 wherein the device is a hub.

4. The failure-recovery software module of claim 1 wherein the status query is via a status change pipe defined by end points supporting interrupt transfers, on the non-responsive device.

5. The failure-recovery software module of claim 1 wherein the first defined state is to power off the non-responsive device.

6. A method for correcting failure of a device connected to a master-slave bus organized in a tree structure comprising a plurality of devices, the tree structure including branches formed by a first device upstream port connected to a second device downstream port, the tree structure having furthermore a root corresponding to a master control for managing the master-slave bus, and the method comprising:

detecting a non-responsive device connected to the master-slave bus, wherein the non-responsive device does not respond to a status query by a master-slave bus system software in conformity with a specified time interval;

determining that the non-responsive device is powered and connected to the master-slave bus;

resetting a downstream port on a device upstream of the non-responsive device to place the non-responsive device in a first defined state;

configuring the non-responsive device to be in a second defined state from the first defined state; and unloading device drivers corresponding to devices downstream of the non-responsive device.

7. The method of claim 6 wherein the master-slave bus is a universal serial bus.

8. The method of claim 6 wherein the device is a hub.

9. The method of claim 6 wherein the status query is via a status change pipe, defined by end points supporting interrupt transfers, on the non-responsive device.

10. The method of claim 6 wherein the first defined state is to power off the non-responsive device.

11. The method of claim 6 wherein configuring the non-responsive device in the second defined state includes renegotiating resources for the non-responsive device with system software for the master-slave bus.

12. The method of claim 6 further comprising:
enumerating the devices downstream of the non-responsive device; and
configuring the devices downstream of the non-responsive device.

13. A universal serial bus packaged with a computer, the universal serial bus comprising:
a host having a root hub with at least one downstream port for connecting a device;
universal serial bus system software;
at least one driver for the host; and
a failure-recovery module for resetting a hub connected to the universal serial bus, the failure recovery module having a failure-recovery software module comprising computer-executable instructions for:
detecting a non-responsive device connected to the universal serial bus, wherein the non-responsive hub does not respond to a status query by the universal serial bus system software in conformity with a specified time interval;
determining that the hub is powered and connected to the universal serial bus;
resetting a downstream port on a hub upstream of the hub to place the hub in a first defined state;
configuring the hub to be in a second defined state from the first defined state and
releasing resources allocated to devices downstream of the non-responsive hub.

14. The universal serial bus packaged with a computer of claim 13 wherein furthermore the failure-recovery software module having the status query via a status change pipe, defined by end points supporting interrupt transfers, on the non-responsive device.

15. The universal serial bus packaged with a computer claim 13 wherein furthermore the failure-recovery software module using the first defined state is to power off the non-responsive device.

16. A failure-recovery software module for correcting failure of a device connected to a master-slave bus organized in a tree structure comprising a plurality of devices, the tree structure including branches formed by a first device upstream port connected to a second device downstream port, the tree structure having furthermore a root corresponding to a master control for managing the master-slave bus, and the failure-recovery software module comprising computer-executable instructions for:
detecting a non-responsive device connected to the master-slave bus, wherein the non-responsive device does not respond to a status query by a master-slave bus system software in conformity with a specified time interval;
determining that the non-responsive device is powered and connected to the master-slave bus;
requesting resetting a downstream port on a device upstream of the non-responsive device to place the non-responsive device in a first defined state;
configuring the non-responsive device to be in a second defined state from the first defined state; and
releasing resources allocated to devices downstream of the non-responsive device.

17. The failure-recovery software module of claim 16 wherein the master-slave bus is a universal serial bus.

18. The failure-recovery software module of claim 16 wherein the non-responsive device is a hub.

19. The failure-recovery software module of claim 16 wherein the status query is via a status change pipe defined by end points supporting interrupt transfers on the non-responsive device.

20. The failure-recovery software module of claim 16 wherein the first defined state is to power off the non-responsive device.

21. A failure-recovery software module for correcting failure of a hub connected to a universal serial bus organized in a tree structure comprising a plurality of devices, the tree structure including branches formed by a first device upstream port connected to a second device downstream port, the tree structure having furthermore a root corresponding to a master control for managing the universal serial bus, and the failure-recovery software module comprising computer-executable instructions for:
detecting a non-responsive hub connected to the universal serial bus, wherein the non-responsive hub does not respond to a status query by a universal serial bus system software in conformity with a specified time interval;
determining that the non-responsive hub is powered and connected to the universal serial bus;
requesting resetting a downstream port on a device upstream of the non-responsive hub to place the non-responsive hub in a first defined state of being powered off; and
configuring the non-responsive hub to be in a second defined state from the first defined state;
wherein the status query is via a status change pipe defined by end points supporting interrupt transfers on the hub.

22. A method for correcting failure of a device connected to a master-slave bus organized in a tree structure comprising a plurality of devices, the tree structure including branches formed by a first device upstream port connected to a second device downstream port, the tree structure having furthermore a root corresponding to a master control for managing the master-slave bus, and the method comprising:
detecting a non-responsive device connected to the master-slave bus, wherein the non-responsive device does not respond to a status query by a master-slave bus system software in conformity with a specified time interval;
determining that the non-responsive device is powered and connected to the master-slave bus;
resetting a downstream port on a device upstream of the non-responsive device to place the non-responsive device in a first defined state;
configuring the non-responsive device to be in a second defined state from the first defined state; and
releasing resources allocated to devices downstream of the non-responsive device.

23. The method of claim 22 wherein the master-slave bus is a universal serial bus.

24. The method of claim 22 wherein the non-responsive device is a hub.

25. The method of claim 22 wherein the status query is via a status change pipe defined by end points supporting interrupt transfers on the non-responsive device.

26. The method of claim 22 wherein the first defined state is to power off the non-responsive device.

27. The method of claim 22 wherein configuring the non-responsive device in the second defined state includes renegotiating resources for the non-responsive device with system software for the master-slave bus.

28. The method of claim 22 further comprising:
enumerating the devices downstream of the non-responsive device; and
configuring the devices downstream of the non-responsive device.

29. A method for correcting failure of a hub connected to a universal serial bus organized in a tree structure comprising a plurality of devices, the tree structure including branches formed by a first device upstream port connected to a second device downstream port, the tree structure having furthermore a root corresponding to a master control for managing the universal serial bus, and the method comprising:
detecting a non-responsive hub connected to the universal serial bus, wherein the non-responsive hub does not respond to a status query by a universal serial bus system software in conformity with a specified time interval;
determining that the non-responsive hub is powered and connected to the universal serial bus;
resetting a downstream port on a device upstream of the non-responsive hub to place the non-responsive hub in a first defined state of being powered off; and
configuring the non-responsive hub to be in a second defined state from the first defined state;
wherein the status query is via a status change pipe defined by end points supporting interrupt transfers on the hub.

30. A method for correcting failure of a hub connected to a universal serial bus organized in a tree structure comprising a plurality of devices, the tree structure including branches formed by a first device upstream port connected to a second device downstream port, the tree structure having furthermore a root corresponding to a master control for managing the universal serial bus, and the method comprising:
detecting a non-responsive hub connected to the universal serial bus, wherein the non-responsive hub does not respond to a status query by a universal serial bus system software in conformity with a specified time interval;
determining that the non-responsive hub is powered and connected to the universal serial bus;
resetting a downstream port on a device upstream of the non-responsive hub to place the non-responsive hub in a first defined state;
renegotiating resources for the non-responsive hub with system software for the universal serial bus to configure the hub in the second defined state; and
configuring the non-responsive hub to be in a second defined state from the first defined state according to the renegotiation step;
wherein the status query is via a status change pipe defined by end points supporting interrupt transfers on the hub.

31. The method of claim 30 further comprising:
enumerating devices downstream of the hub; and
configuring the devices downstream of the hub.

32. A method for correcting failure of a device connected to a master-slave bus organized in a tree structure comprising a plurality of devices, the tree structure including branches formed by a first device upstream port connected to a second device downstream port, the tree structure having furthermore a root corresponding to a master control for managing the master-slave bus, and the method comprising:
detecting a non-responsive device connected to the master-slave bus, wherein the non-responsive device does not respond to a status query by a master-slave bus system software in conformity with a specified time interval;
determining that the non-responsive device is powered and connected to the master-slave bus;
resetting a downstream port on a device upstream of the non-responsive device to place the non-responsive device in a first defined state;
configuring the non-responsive device to be in a second defined state from the first defined state; and
scheduling, after a first time interval, determining that the non-responsive device is powered and connected to the master-slave bus; resetting a downstream port on a device upstream of the non-responsive device to place the non-responsive device in a first defined state; and configuring the non-responsive device to be in a second defined state from the first defined state.

33. A universal serial bus packaged with a computer, the universal serial bus comprising:
a host having a root hub with at least one downstream port for connecting a device;
universal serial bus system software;
at least one driver for the host; and
a failure-recovery module for resetting a hub connected to the universal serial bus, the failure recovery module having a failure-recovery software module comprising computer-executable instructions for:
detecting a non-responsive device connected to the universal serial bus, wherein the non-responsive hub does not respond to a status query by the universal serial bus system software in conformity with a specified time interval;
determining that the hub is powered and connected to the universal serial bus;
resetting a downstream port on a hub upstream of the hub to place the hub in a first defined state;
configuring the hub to be in a second defined state from the first defined state; and
unloading device drivers corresponding to devices downstream of the non-responsive hub.

* * * * *